United States Patent
Kaphengst et al.

(10) Patent No.: US 11,923,686 B1
(45) Date of Patent: Mar. 5, 2024

(54) USE OF VEHICLE BATTERY TO PROVIDE POWER TO MANUFACTURING OPERATIONS

(71) Applicant: GM GLOBAL TECHNOLOGY OPERATIONS LLC, Detroit, MI (US)

(72) Inventors: Michael R Kaphengst, Leonard, MI (US); Seog-Chan Oh, Troy, MI (US); Joshua Lee Solomon, Berkley, MI (US); James W Wells, Rochester Hills, MI (US); Alfred Manser, White Lake, MI (US); Barry L Farmer, Imlay City, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/931,997

(22) Filed: Sep. 14, 2022

(51) Int. Cl.
| | |
|---|---|
| *B60L 55/00* | (2019.01) |
| *H02J 3/32* | (2006.01) |
| *H02J 7/00* | (2006.01) |
| *H02J 50/10* | (2016.01) |

(52) U.S. Cl.
CPC ............ *H02J 3/322* (2020.01); *H02J 7/0032* (2013.01); *H02J 50/10* (2016.02); *B60L 55/00* (2019.02)

(58) Field of Classification Search
CPC ................................ B60L 55/00; H02J 3/322
See application file for complete search history.

(56) References Cited

U.S. PATENT DOCUMENTS 11,863,546 * 1/2024 McCall ............... H04L 63/0823

FOREIGN PATENT DOCUMENTS

DE 102018131875 A1 * 6/2020 .............. B60L 53/62

* cited by examiner

*Primary Examiner* — Daniel Cavallari
(74) *Attorney, Agent, or Firm* — Lorenz & Kopf, LLP

(57) ABSTRACT

In accordance with exemplary embodiments, methods and systems are provided for providing electrical power for a manufacturing facility for manufacturing of a vehicle, the vehicle having a rechargeable energy storage system (RESS) and a processor, including: positioning the vehicle at the manufacturing facility, the manufacturing facility having an electrical component; and providing electrical power from the RESS of the vehicle to the electrical component of the manufacturing facility, in accordance with instructions provided by the processor.

20 Claims, 6 Drawing Sheets

USE OF VEHICLE BATTERY TO PROVIDE POWER TO MANUFACTURING OPERATIONS

TECHNICAL FIELD

The technical field generally relates to vehicles and, more specifically, to methods and systems for providing electrical power for vehicle manufacturing operations.

BACKGROUND

Vehicles today are often manufactured in manufacturing facilities, such as vehicle assembly sites, that require electrical power. Typically electrical power is wired into various locations of the manufacturing facilities. However, current techniques for providing power for the manufacturing facilities may not always be optimal, for example due to constraints involving time, cost, and/or governmental regulations in certain situations. For example, in certain embodiments, existing manufacturing facilities may face limitations or constraints with respect to reconfigurability of manufacturing systems, such as adding or moving work stations without removing hard-wired electrical lines, and so on.

Accordingly, it is desirable to provide improved methods and systems for providing electrical power for vehicle manufacturing facilitates, such as vehicle assembly sites. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided for providing electrical power for a manufacturing facility for manufacturing of a vehicle, the vehicle having a rechargeable energy storage system (RESS) and a processor, the method including: positioning the vehicle at the manufacturing facility, the manufacturing facility having an electrical component; and providing electrical power from the RESS of the vehicle to the electrical component of the manufacturing facility, in accordance with instructions provided by the processor.

Also in an exemplary embodiment, the manufacturing facility includes an assembly site including a plurality of cells for assembling the vehicle, each of the plurality of cells having the electrical component; and the step of positioning the vehicle includes moving the vehicle to a cell of the plurality of cells, in accordance with instructions provided by the processor.

Also in an exemplary embodiment: the vehicle further includes a transmitter; the manufacturing facility further includes a receiver; and the step of providing electrical power includes providing the electrical power from the RESS of the vehicle to the electrical component of the manufacturing facility via transmission from the transmitter of the vehicle to the receiver of the manufacturing facility, in accordance with instructions provided by the processor.

Also in an exemplary embodiment, the manufacturing facility further includes one or more inductive charging floor plates; and the step of providing electrical power includes providing the electrical power from the RESS of the vehicle to the electrical component of the manufacturing facility via transmission from the transmitter of the vehicle to the receiver of the manufacturing facility through the one or more inductive charging floor plates, in accordance with instructions provided by the processor.

Also in an exemplary embodiment, the transmitter of the vehicle includes a wireless transmitter; the receiver of the manufacturing facility includes a wireless receiver; and the step of providing electrical power includes providing the electrical power from the RESS of the vehicle to the electrical component of the manufacturing facility via transmission from the wireless transmitter of the vehicle to the wireless receiver of the manufacturing facility via power beaming.

Also in an exemplary embodiment, the vehicle further includes an electrical port configured to accept a conduit associated with the electrical component of the manufacturing facility; and the step of providing electrical power includes providing the electrical power from the RESS of the vehicle to the electrical component of the manufacturing facility via the electrical port when the conduit is plugged into the electrical port.

Also in an exemplary embodiment, the manufacturing facility further includes a manufacturing facility RESS that is coupled to the electrical component; and the step of providing electrical power includes providing the electrical power from the RESS of the vehicle to the manufacturing facility RESS for use by the electrical component.

Also in an exemplary embodiment, the method further includes: obtaining sensor data with respect to a charging rate or discharging rate of the RESS of the vehicle via one or more sensors of the vehicle; and providing fault diagnostics for the RESS of the vehicle based on a comparison of the charging rate or discharging rate with one or more threshold values stored in a non-transitory, computer readable storage medium of the vehicle.

Also in an exemplary embodiment, the method further includes: determining, via the processor, a current mode for the vehicle as to whether the RESS of the vehicle is charging, providing electrical power for the manufacturing facility, in motion, or stopped, wherein the one or more threshold values are dependent upon the current mode for the vehicle.

In another exemplary embodiment, a vehicle is provided that includes: a body; a rechargeable energy storage system (RESS); and a processor that is coupled to the RESS of the vehicle and that is configured to at least facilitate: positioning the vehicle at a manufacturing facility for manufacturing of the vehicle, the manufacturing facility having an electrical component; and providing electrical power from the RESS of the vehicle to the electrical component of the manufacturing facility, in accordance with instructions provided by the processor.

Also in an exemplary embodiment, the vehicle further includes a propulsion system configured to generate movement of the body to the manufacturing facility, that manufacturing facility including a plurality of cells for assembling the vehicle, each of the plurality of cells having the electrical component; and the processor is further configured to at least facilitate moving the vehicle to a cell of the plurality of cells, in accordance with instructions provided by the processor.

Also in an exemplary embodiment, the vehicle further includes a transmitter; and the processor is further configured to at least facilitate providing the electrical power from the RESS of the vehicle to the electrical component of the manufacturing facility via transmission from the transmitter of the vehicle to a receiver of the manufacturing facility, in accordance with instructions provided by the processor.

In another exemplary embodiment, the processor is further configured to at least facilitate providing the electrical power from the RESS of the vehicle to the electrical component of the manufacturing facility via transmission from the transmitter of the vehicle to the receiver of the manufacturing facility through one or more inductive charging floor plates of the manufacturing facility, in accordance with instructions provided by the processor.

Also in an exemplary embodiment, the transmitter of the vehicle includes a wireless transmitter; and the processor is further configured to at least facilitate providing the electrical power from the RESS of the vehicle to the electrical component of the manufacturing facility via transmission from the wireless transmitter of the vehicle to a wireless receiver of the manufacturing facility via power beaming.

Also in an exemplary embodiment, the vehicle further includes an electrical port configured to accept a conduit associated with the electrical component of the manufacturing facility; and the processor is further configured to at least facilitate providing the electrical power from the RESS of the vehicle to the electrical component of the manufacturing facility via the electrical port when the conduit is plugged into the electrical port.

Also in an exemplary embodiment, the processor is further configured to at least facilitate providing the electrical power from the RESS of the vehicle to a manufacturing facility RESS for use by the electrical component.

Also in an exemplary embodiment, the vehicle further includes: a non-transitory, computer readable storage medium storing one or more threshold values; and one or more sensors configured to obtain sensor data with respect to a charging rate or discharging rate of the RESS of the vehicle; wherein the processor is further configured to at least facilitate providing fault diagnostics for the RESS of the vehicle based on a comparison of the charging rate or discharging rate with the one or more threshold values.

Also in an exemplary embodiment, the processor is further configured to at least facilitate determining a current mode for the vehicle as to whether the RESS of the vehicle is charging, providing electrical power for the manufacturing facility, in motion, or stopped; and the one or more threshold values are dependent upon the current mode for the vehicle.

In another exemplary embodiment, a system is provided that includes: a manufacturing facility having an electrical component; and a vehicle configured to be coupled to the manufacturing facility, the vehicle including: a body; a rechargeable energy storage system (RESS); and a processor that is coupled to the RESS of the vehicle and that is configured to at least facilitate: positioning the vehicle at the manufacturing facility; and providing electrical power from the RESS of the vehicle to the electrical component of the manufacturing facility, in accordance with instructions provided by the processor.

Also in an exemplary embodiment, the manufacturing facility includes an assembly site including a plurality of cells for assembling the vehicle, each of the plurality of cells having the electrical component; and the vehicle further includes a propulsion system configured to generate movement of the body to the manufacturing facility, in accordance with the instructions provided by the processor.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
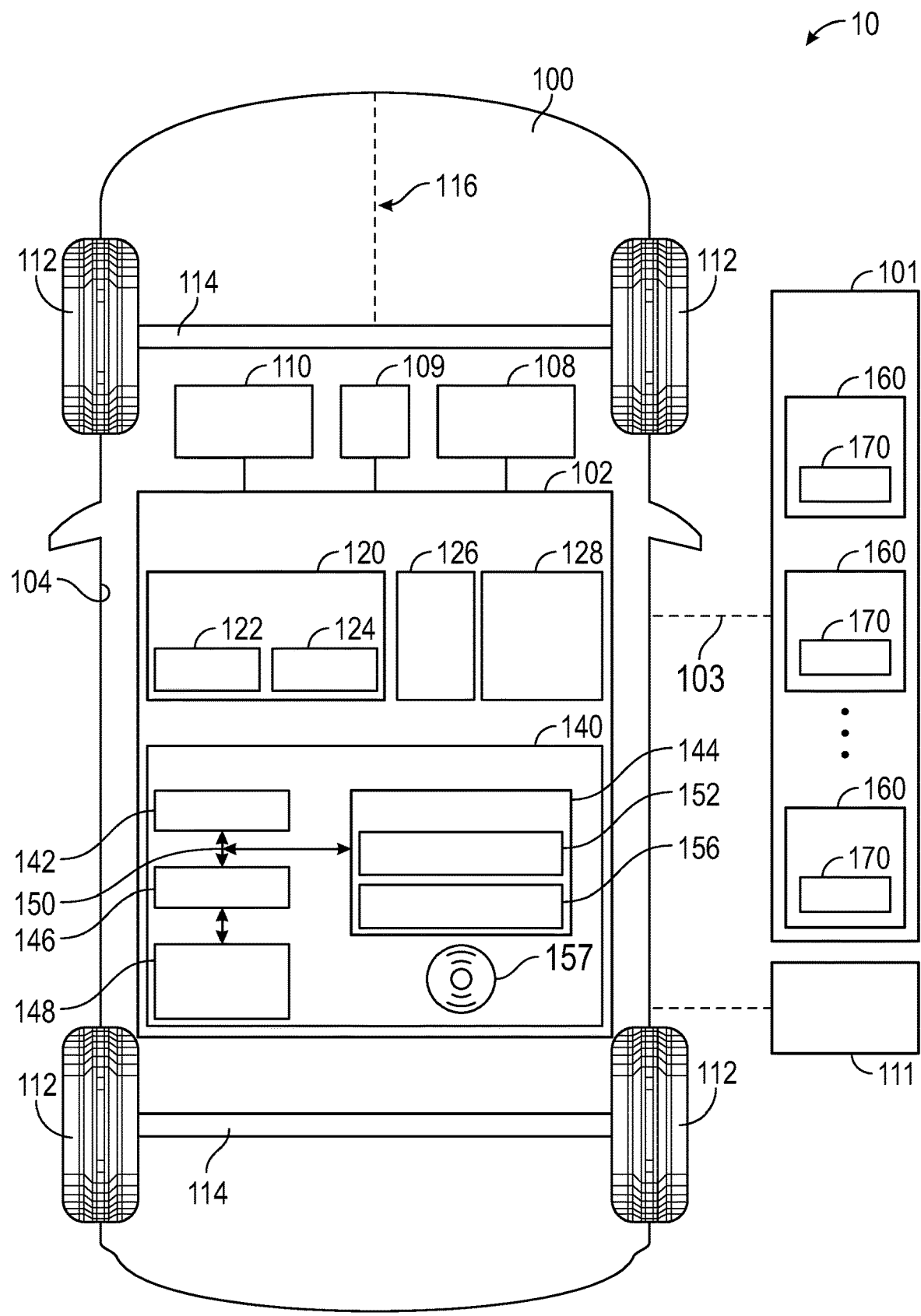
FIG. 1 is a functional block diagram of a system that includes a vehicle and an assembly site in which the vehicle is manufactured, and in which the vehicle provides power for the assembly site during manufacture of the vehicle, in accordance with exemplary embodiments.

FIG. 1 illustrates a system 10 in accordance with an exemplary embodiment. In various embodiments, as depicted in FIG. 1, the system 10 includes a vehicle 100 and an assembly site 101. In various embodiments, the vehicle 100 is manufactured, in whole or in part, at the assembly site 101. In various embodiments, the vehicle 100 is assembled, in whole or in part, at the assembly site 101. In certain embodiments, the assembly site 101 may include one or more assembly plants and/or buildings in which vehicle assembly and/or other manufacturing and/or repair take place; however in other embodiments the assembly site 101 may include a location in which vehicle assembly and/or other manufacturing and/or repair take place without a particular building or other plant.

As described in greater detail further below, in various embodiments the vehicle 100 includes a rechargeable energy storage system (RESS) 108 and a control system 102 for controlling various functions of the vehicle 100, including control of movement of the vehicle 100 along the assembly site 101 and control of providing electrical power from the RESS 108 to the assembly site 101 for use in assembling the vehicle 100 (and, in certain embodiments, for one or more other manufacturing processes performed by the assembly site 101 with respect to the vehicle 100).

As depicted in FIG. 1, in various embodiments, the assembly site 101 includes various stations or cells 160 (collectively referred to herein as "cells" for ease of reference) in which the vehicle 100 is assembled. In various embodiments, different assembly tasks are completed at each of the different cells 160 (for example, in certain embodiments, different components of the vehicle 100 are assembled at each of the different cells 160). In various embodiments, the assembly site 101 may also refer to or include any number of different types of manufacturing facilities for which vehicle assembly and/or other types of manufacturing processes are performed for the vehicle 100. Also in various embodiments, each of the cells 160 utilizes electrical power from the vehicle 100 via one or more electrical components 170 of the cell 160.

In various embodiments, one or more electrical connections 103 (e.g., wired or wireless) may be utilized for providing electrical power from the vehicle 100 to the cells 160. In addition, in various embodiments, the RESS 108 of the vehicle 100 may be charged via one or more charging stations 111. In certain embodiments the one or more charging stations 111 are part of the assembly site 101, while in other embodiments the one or more charging stations 111 may be separate from the assembly site 101.

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112 and axles 114 coupled thereto. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112 via the axles 114. In the depicted embodiment, the drive system 110 comprises a propulsion system that includes one or more motors and/or engines (such as in a hybrid drive system). In one embodiment, the drive system includes one or more electrical motors, and the drive system 100 comprises an electrical vehicle. In certain embodiments, the drive system 100 may vary, and for example may include one or more other different types of motors and/or engines, for example using one or more fuel cells, hydrogen, and/or other techniques. In various embodiments, the drive system 110 provides for movement of the vehicle 100 along the assembly site 101 from cell 160 to cell 160 during assembly of the vehicle 100, in addition to movement of the vehicle 100 once the assembly process is complete.

As noted above, the vehicle 100 includes a rechargeable energy storage system (RESS) 108. In various embodiment, the RESS 108 (e.g., comprising one or more vehicle batteries) provide power for the drive system 110, for example for the one or more engines and/or motors thereof. In addition, in various embodiments, the RESS 108 is used to provide power for the cells 160 of the assembly site 101, in conjunction with the electrical components 170 thereof.

In the embodiment depicted in FIG. 1, the control system 102 is coupled to the RESS 108 and to the drive system 110. In certain embodiments, the control system 102 is also configured to be coupled to one or more electrical components 170 of the assembly site 101. In various embodiments, the control system 102 provides instructions for control of the vehicle 100, including movement of the vehicle 100 among the cells 160 of the assembly site 101 and providing power to the electrical components 170 of the assembly site 101, as well as other features of the vehicle 100.

As depicted in FIG. 1, in various embodiments the control system 102 includes a sensor array 120, a transceiver 126 (and/or a transmitter or receiver thereof), a display 128, and a control system 102.

As depicted in FIG. 1, in various embodiments, the sensor array 120 includes one or more electrical charge sensors 122. In various embodiments, the electrical charge sensors 122 (also referred to herein as "charge sensors" 122) measure a current electrical charge of the RESS 108 as well as a rate of charging or discharging of the RESS 108, and/or obtain sensor data that may be used for determining these values. Also in various embodiments, the electrical charge sensors 122 provide this sensor data to the control system 102 for processing, for example in accordance with the steps of the process 200 and implementations thereof as described further below. Also as depicted in FIG. 1, in certain embodiments the sensor array 120 may also include one or more other sensors 124, for example for obtaining other sensor data (for example, as to measurement of a speed of the vehicle 100 and/or for detection of the cells 160 and/or paths for movement of the vehicle 100 therebetween in certain embodiments, and so on).

Figure 2:
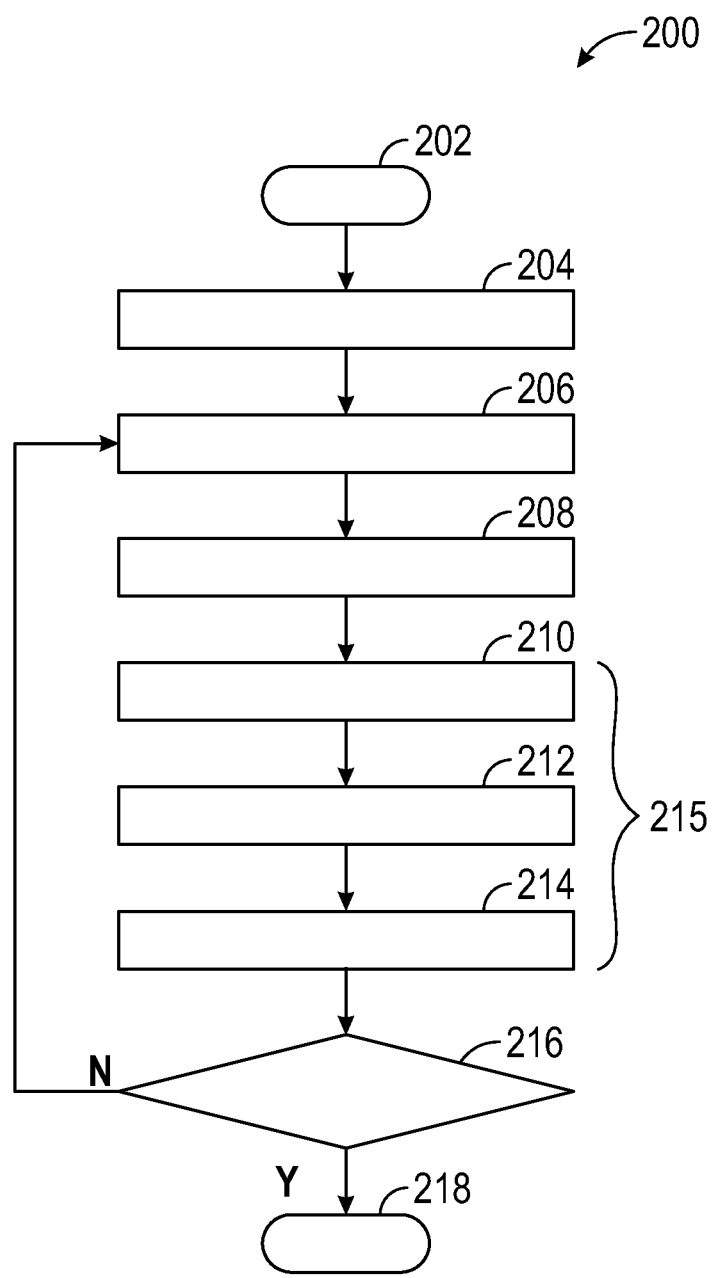
FIG. 2 is a flowchart of a process for providing power from a vehicle having a rechargeable energy storage system (RESS) to an assembly site for manufacturing the vehicle, and that can be implemented in connection with the system of FIG. 1, including the vehicle and the assembly site, in accordance with exemplary embodiments.

In certain embodiments, the transceiver 126 is utilized for providing electrical power from the RESS 108 to one or more electrical components of the assembly site 101, for example in accordance with the process 200 of FIG. 2 and/or one or more implementations thereof. In certain embodiments, such functionality may be performed by a transmitter of the vehicle 100, without requiring a full transceiver for the vehicle 100 (e.g., in certain embodiments, a transmitter of the vehicle 100 may communicate with one or more receivers of assembly site 101, for example as described in greater detail further below).

In addition, in certain embodiments, the display 128 is utilized in providing information as to one or more detected faults of the vehicle 100, for example in accordance with the process 200 of FIG. 2 and/or one or more implementations thereof. In various embodiments, the display 128 may include one or more visual, audio, haptic, and/or other types of displays.

In various embodiments, the controller 140 is coupled to the RESS 108, the drive system 110, the sensor array 120, the transceiver 126, and the display 128. In certain embodiments, the controller 140 is also coupled to one or more electrical components 170 of the assembly site 101. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls movement of the vehicle 100 among the cells 160 of the assembly site 101 and the providing of electrical power therefor, among other functions of the vehicle 100. In various embodiments, the controller 140 provides these and other functions in accordance with the steps of the process 200 of FIG. 2 and implementations of FIGS. 3-8 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementations of FIGS. 3-8 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 156 (e.g., threshold values relating to charging or charging of the RESS 108).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the process 200 of FIG. 2 and implementations of FIGS. 3-8 and as described further below in connection therewith.

In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With reference to FIG. 2, a flowchart is provided of a process 200 for providing power from a vehicle having rechargeable energy storage system (RES S) to an assembly site for manufacturing the vehicle, in accordance with exemplary embodiments. In various embodiments, the process 200 can be implemented in connection with the system 10 of FIG. 1, including the vehicle 100 and the assembly site 101 of FIG. 1 and the component thereof. The process 200 is described below in connection with FIG. 2 as well as FIGS. 3-8 (which depict exemplary implementations of the process 200).

As depicted in FIG. 2, the process 200 begins at step 202. In one embodiment, the process 200 begins when a vehicle is in a manufacturing process. In certain embodiments, the process 200 begins when the vehicle 100 of FIG. 1 is already partially manufactured (e.g., so as to include the RESS 108, the drive system 110, and the control system 102 of FIG. 1), and is ongoing further assembly and/or other manufacturing, for example at the assembly site 101 of FIG. 1. In one embodiment, the steps of the process 200 are performed continuously during the assembly (and/or other manufacturing) of the vehicle at the assembly site 101.

In various embodiments, sensor data is obtained (step 204). In various embodiments, sensor data is obtained with respect to an electrical charge of the RESS 108 of the vehicle 100 of FIG. 1, including a current state of charge as well as charging and/or discharging rates for the RESS 108 as the vehicle 100 is disposed at the assembly site 101. In various embodiments, the sensor data is obtained from the sensor array 120 of FIG. 1, including the electrical charge sensors 122 thereof. Also in various embodiments, the sensor data is obtained throughout the process 200.

In various embodiments, the vehicle is positioned at a manufacturing facility where the vehicle is to be manufactured (or in which manufacturing processes are to be performed with respect to the vehicle) (step 206). Specifically, in various embodiments, the vehicle 100 of FIG. 1 is moved to one of the cells 160 of the assembly site 101 of FIG. 1 for assembly and/or other manufacturing processes. In various embodiments, the vehicle 100 moves on its own power to one of the cells 160, via the drive system 110 in accordance with instructions provided by the processor 142 of FIG. 1. In various embodiments, this is performed when the vehicle 100 is ready for further assembly and a particular cell 160 is ready to perform assembly for the vehicle 100 (e.g., as determinized by the processor 142 via obtained from the sensor array 120 and/or messages obtained via the transceiver 126, and so on in certain embodiments).

Also in various embodiments, the vehicle provides electrical power for the cell (step 208). In various embodiments, the vehicle 100 of FIG. 1 provides electrical power from the RESS 108 to one of the cells 160 of FIG. 1 via the electrical component 170 thereof, in accordance with instructions provided by the processor 142 of FIG. 1.

With reference to FIGS. 3-6, different exemplary implementations are provided with respect to the providing of electrical power from the vehicle 100 to the cell 160 of the assembly site 101, in accordance with various different embodiments.

Figure 3:
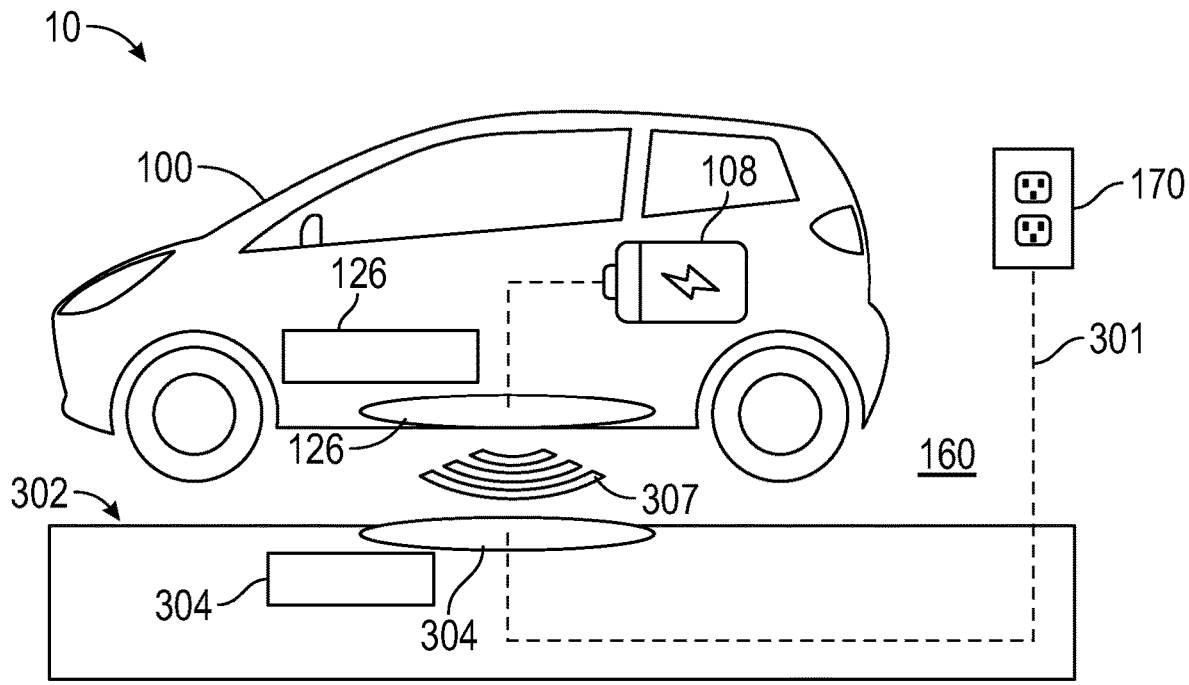
FIGS. 3-6 depict exemplary implementations of the process of FIG. 2, including the providing of power from a vehicle to a cell of an assembly site, and that can be implemented in connection with the system of FIG. 1, in accordance with exemplary embodiments.

First, with reference to FIG. 3, a first exemplary illustration is provided by which the vehicle 100 provides electrical power for the cell 160, in accordance with a first exemplary embodiment. As depicted in FIG. 3, in this embodiment, the cell 160 includes one or more floor plates 302 over which the vehicle 100 is to be positioned. In certain embodiments, the floor plates 302 comprise inductive charging floor plates 302 having one or more receivers 304 built in to the floor plates 302. In various embodiments, as depicted in FIG. 3, the transmitter 126 (or a transmitter thereof) of the vehicle 100 transmits electrical power from the RESS 108 of the vehicle 100 to one or more receivers 304 of the floor plates 302 of the cell 160. In various embodiments, the electrical power is then supplied from the floor plates 302 to the electrical component 170 (e.g., to an electrical charge port) of the cell 160 via one or more electrical connections 301 (e.g., one or more wired electrical cables or conduits 301 in certain embodiments).

In certain embodiments the vehicle 100 may move over the floor plates 302 as the electrical power is being provided, whereas in certain other embodiments the vehicle 100 may be stationary over the floor plates 302 as the electrical power is being provided. In either case, in various embodiments, the electrical power that is provided from the vehicle 100 to the cell 160 is then utilized by the cell 160 to perform further assembly of the vehicle 100 (e.g., by installing one or more additional vehicle components) and/or to perform one or more other manufacturing processes for the vehicle 100 as the vehicle continues to be manufactured and assembled at the assembly site 101.

Figure 4:
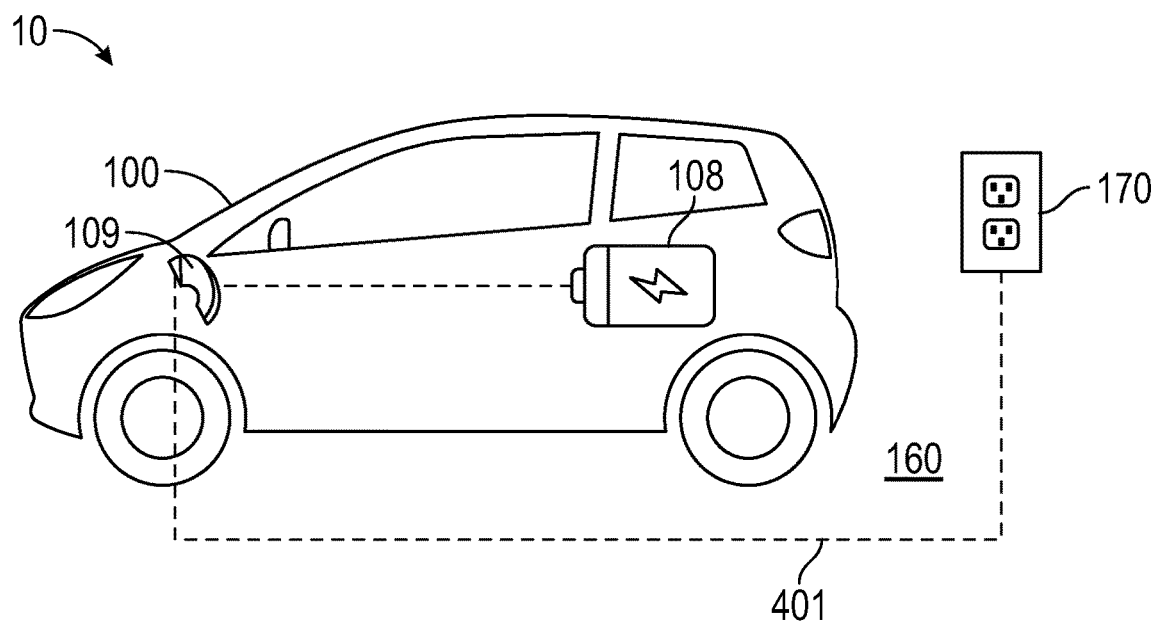

Next, with reference now to FIG. 4, a second exemplary illustration is provided by which the vehicle 100 provides electrical power for the cell 160, in accordance with a second exemplary embodiment. As depicted in FIG. 4, in this embodiment, the outlet port 109 of the vehicle 100 is connected directly to the electrical component 170 (e.g., to an electrical charging port) of the cell 160 via one or more electrical connections 401 (e.g., one or more wired electrical cables or conduits 401 in certain embodiments).

In certain embodiments corresponding to FIG. 4, a manual conductive connection is provided as the electrical connection 401 (e.g., the electrical cable or conduit) is manually plugged into the outlet port 109, thereby allowing the electrical power to flow from the RESS 108 of the vehicle 100 to the electrical component 170 of the cell 160 of the assembly site 101. In various embodiments, the electrical power that is provided from the vehicle 100 to the cell 160 is then utilized by the cell 160 to perform further assembly of the vehicle 100 (e.g., by installing one or more additional vehicle components) and/or to perform one or more other manufacturing processes for the vehicle 100 as the vehicle continues to be manufactured and assembled at the assembly site 101.

Figure 5:
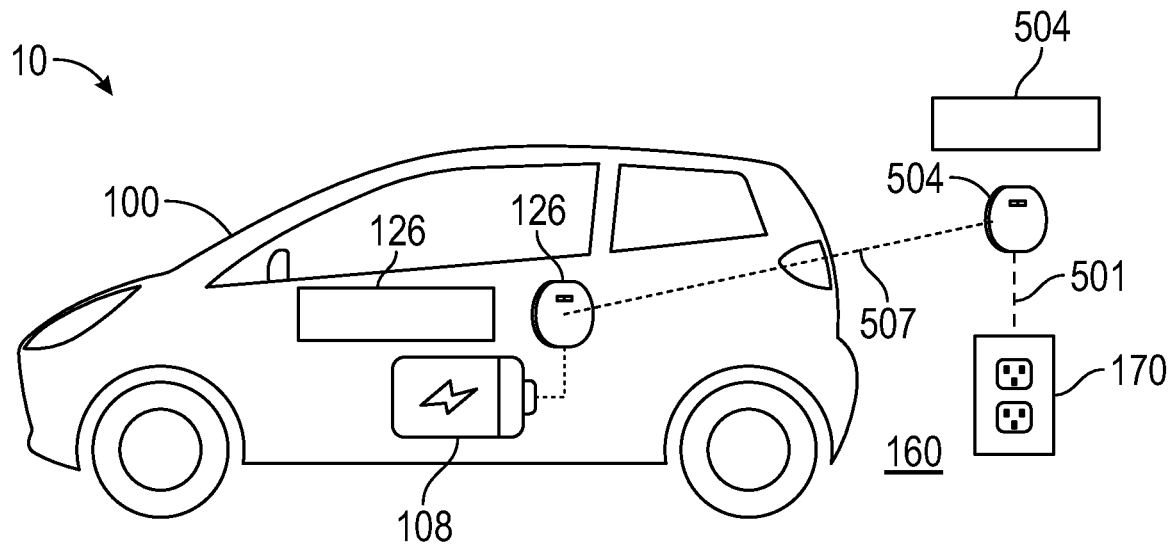

With reference now to FIG. 5, a third exemplary illustration is provided by which the vehicle 100 provides electrical power for the cell 160, in accordance with a third exemplary embodiment. In the embodiment depicted in FIG. 5, a power beaming strategy is implemented using wireless technology to transfer energy form the RESS 108 of the vehicle 100 to the electrical component 170 of the cell 160. Specifically, in various embodiments, a wireless transceiver (and/or transmitter) 126 of the vehicle 100 provides electrical power to a wireless receiver 504 of the cell 160, in a wireless transfer of electrical power using the power beaming strategy.

Also as depicted in FIG. 5, in various embodiments the electrical power is then supplied from the wireless receiver 504 to the electrical component 170 (e.g., to an electrical charge port) of the cell 160 via one or more electrical connections 501 (e.g., one or more wired electrical cables or conduits 501 in certain embodiments). In various embodiments, the electrical power that is provided from the vehicle 100 to the cell 160 is then utilized by the cell 160 to perform further assembly of the vehicle 100 (e.g., by installing one or more additional vehicle components) and/or to perform one or more other manufacturing processes for the vehicle 100 as the vehicle continues to be manufactured and assembled at the assembly site 101.

Figure 6:
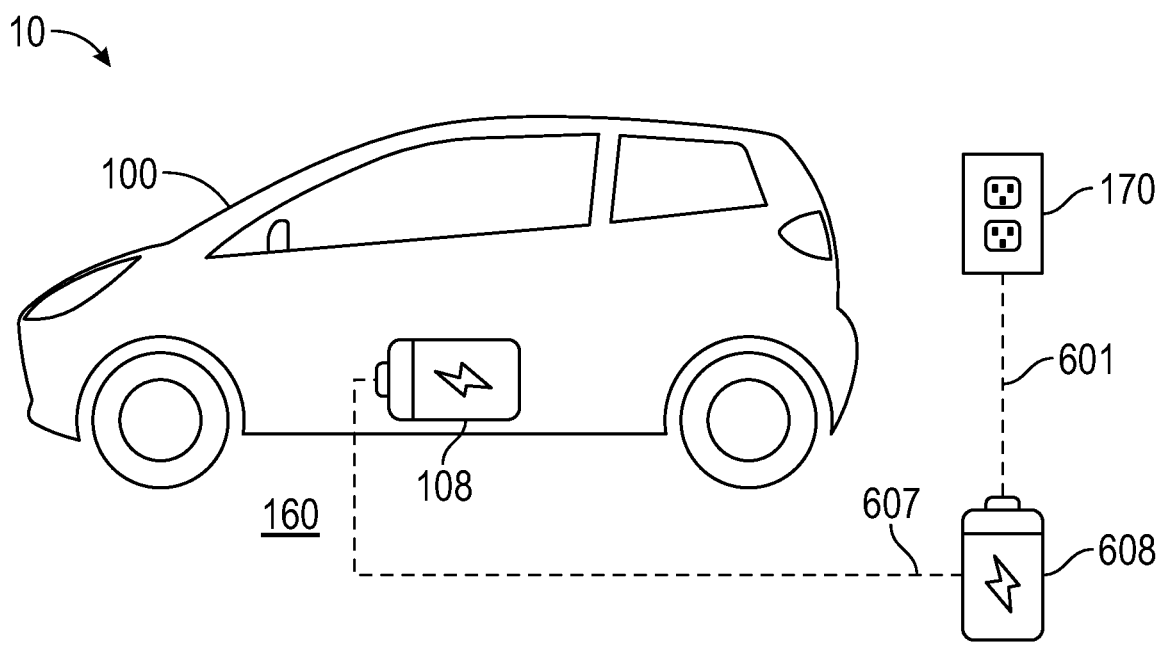

With reference next to FIG. 6, a fourth exemplary illustration is provided by which the vehicle 100 provides electrical power for the cell 160, in accordance with a fourth exemplary embodiment. In the embodiment depicted in FIG. 6, the cell 160 includes its own rechargeable energy storage system (RESS) 608. In certain embodiments, the RESS 608 comprises a portable RESS (e.g., battery) 608 that can be moved into and out of the cell 160 as needed (for example, if the cell 160 is in a remote location). In certain other embodiments, the RESS 608 may instead comprise a more permanent RESS (e.g., battery) 608 that is built into the cell 160 and/or otherwise integrated into the cell 160 on a longer term basis.

In various embodiments as depicted in FIG. 6, the RESS 608 of the cell 160 receives electrical power directly from the RESS 108 of the vehicle 100 via one or more electrical connections 607. In one embodiment, the one or more electrical connections 607 facilitate inductive charging of the RESS 608 of the cell 160 via the RESS 108 of the vehicle 100. In another embodiment, the one or more electrical connections 607 facilitate conductive charging of the RESS 608 of the cell 160 via the RESS 108 of the vehicle 100. In yet another embodiment, the one or more electrical connections 607 facilitate charging of the RESS 608 of the cell 160 via power beaming from the RESS 108 of the vehicle 100.

With continued reference to FIG. 6, in various embodiments, the electrical power is then supplied from the RESS 608 of the cell 160 to the electrical component 170 (e.g., to an electrical charge port) of the cell 160 via one or more electrical connections 601 (e.g., one or more wired electrical cables or conduits 601 in certain embodiments). Also in various embodiments, the electrical power that is provided from the vehicle 100 to the cell 160 is then utilized by the cell 160 to perform further assembly of the vehicle 100 (e.g., by installing one or more additional vehicle components) and/or to perform one or more other manufacturing processes for the vehicle 100 as the vehicle continues to be manufactured and assembled at the assembly site 101.

With reference back to FIG. 2, in various embodiments, the vehicle RESS is recharged when necessary (step 210). In various embodiments, the vehicle 100 is moved to a charging station (such as the charging station 111 of FIG. 1), and the RESS 108 is charged via the charging station 111, when a current charge of the RESS 108 is less than a predetermined threshold value, as determined by the processor 142. In various embodiments, the vehicle 100 is moved to the charging station 111 via the drive system 110 in accordance with instructions provided by the processor 142 when charging is deemed necessary by the processor 142. As discussed above, in certain embodiments the charging station 111 may be part of the assembly site 101, whereas in certain other embodiments the charging station 111 may be separate from the assembly site 101.

With continued reference to FIG. 2, in various embodiments the charge of the vehicle RESS is monitored (step 212). In various embodiments, the processor 142 of FIG. 1 monitors the charge of the RESS 108 of the vehicle 100 of FIG. 1, including a current state of charge and rates of charging and/or discharging of the RESS 108, via sensor data obtained from the sensor array 120 via various iterations of step 204.

Also in various embodiments, and as alluded to above, fault diagnostics are performed (step 214). In various embodiments, the fault diagnostics are performed by the processor 142 of FIG. 1 based on the sensor data and the monitoring of the RESS 108 in step 212, including based on the charging rate and the discharging rate of the RESS 108 as determined based on the sensor data. In various embodiments, the monitoring of step 212 and the fault diagnostics of step 214 (based on the monitoring) are performed in parallel with the movement, supplying of power, and recharging of steps 206-210.

As denoted in FIG. 2, in certain embodiments, steps 210, 212, and 214 may also be collectively referred to and/or described as a combined step (or combined sub-process) 215, which will now be described in greater detail below with reference to FIG. 7.

Figure 7:
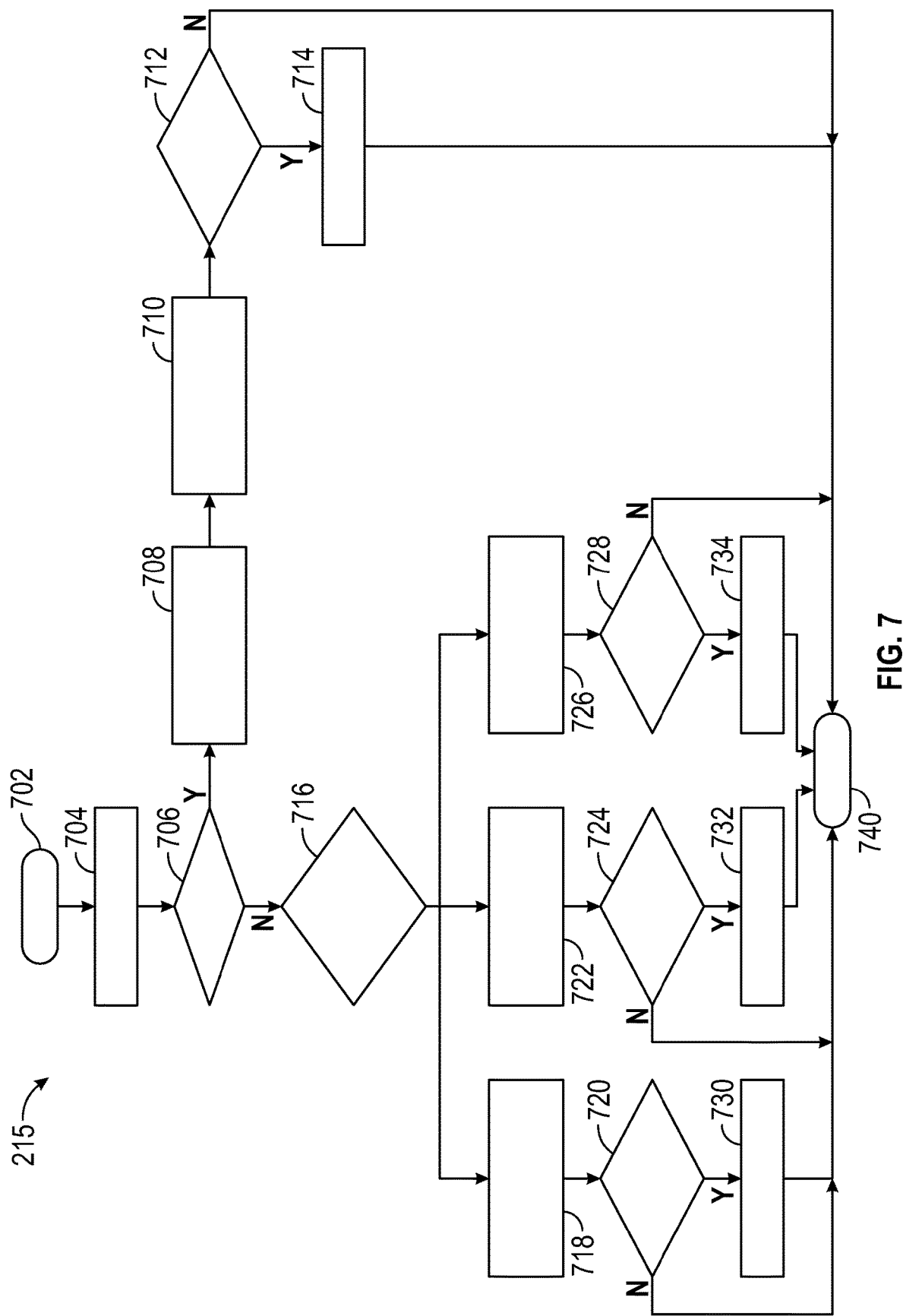
FIG. 7 depicts a flowchart of a process associated with a step of the process of FIG. 2, including the monitoring of the charge of the vehicle RESS, charging the vehicle RESS, and providing fault diagnostics for the vehicle, in accordance with exemplary embodiments.

With reference to FIG. 7, a process is described for the above-referenced combined step 215 of FIG. 2, including the monitoring of the charge of the RESS, the charging of the RESS, and the providing of fault diagnostics for the RESS. As depicted in FIG. 7, the combined step (or sub-process) 215 begins at step 702, after which sensor data is monitored (step 704). In various embodiments, sensor data is monitored as to the charge of the RESS 108, including the current state of charge and rates of charge and discharge thereof. In various embodiments, this corresponds to step 212 of FIG. 2.

In various embodiments, a determination is made as to whether a current charging level "e" is less than a lower bound "$\overline{e}_l$" (step 706). In various embodiments, this determination is made by the processor 142 of FIG. 1 with respect to the current charge level "e" for the RESS 108 of FIG. 1 based on the sensor data, in accordance with the following equation. Also in various embodiments, the lower bound "a" corresponds to the predetermined threshold of step 210 described above, and comprises a lower bound of charge for the RESS 108 such that charging is required when the current electrical charge of the RESS 108 is less than this level. in various embodiments, the lower bound "$\overline{e}_l$" is stored in the memory 144 of FIG. 1 as one of the stored values 156 thereof.

In various embodiments, if it is determined during step 706 that the current charging level "e" is less than the lower bound "$\overline{e}_l$" (i.e., that "e"<"$\overline{e}_l$"), then the vehicle proceeds to the charging station (step 708). As described above in connection with step 210, in various embodiments the vehicle 100 is moved to the charging station via the drive system 110 in accordance with instructions provided by the processor 142.

Also in various embodiments, the RESS is charged at the charging station (step 708) when charging is deemed necessary by the processor 142. In certain embodiments, the RESS 108 of FIG. 1 is charged via the charging station 111 of FIG. 1 until the current charge "e" of the RESS 108 reaches an upper bound "$\overline{e}_u$" to which the RESS 108 is to be re-charged. Also in various embodiments, the upper bound "$\overline{e}_u$" is stored in the memory 144 of FIG. 1 as one of the stored values 156 thereof.

Figure 8:
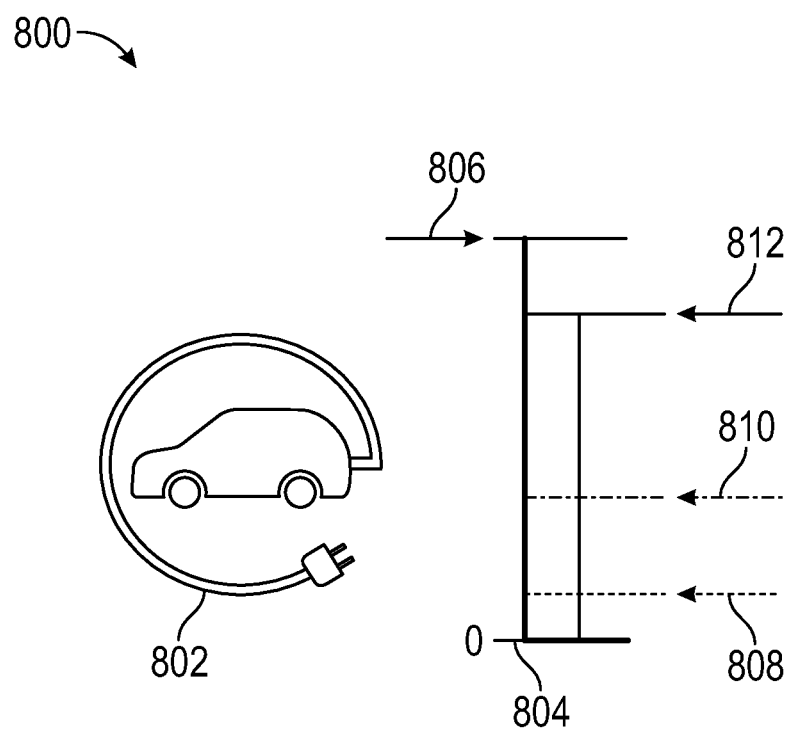
FIG. 8 depicts an exemplary implementation of the process of FIG. 7, and that can be implemented in connection with the system of FIG. 1, in accordance with exemplary embodiments.

With reference to FIG. 8, an illustration 800 is provided as to the charging of the RESS 108 as part of step 708. As depicted in FIG. 8, in various embodiments, the charge of the RESS 108 may vary from a minimum value 804 to a maximum value 806. In certain embodiments, the minimum value 804 is equal to zero; whereas the maximum value 806 corresponds to a maximum capacity of the RESS 108, for example in kilowatt-hours (kW). Also as depicted in FIG. 8: (i) the lower bound "$\overline{e}_l$" triggering the recharging of the RESS 108 is denoted as 808; (ii) the current charging level "e" is denoted as 810; (ii); and (iii) the upper bound "$\overline{e}_u$" to which the RESS 108 is to be re-charged is denoted as 812. Also in certain embodiments, one or more of these values may also be denoted as part of an electrical charge display 802 for the RESS 108.

With reference back to FIG. 7, in certain embodiments during step 710, an actual charging rate $C_+$ is calculated as the RESS 108 is being charged. Specifically, in certain embodiments, the processor 142 of FIG. 1 calculates the actual charging rate $C_+$ as the RESS 108 is being charged at the charging station 111.

Also in various embodiments, a determination is made during step 712 as to whether the actual charging rate $C_+$ during charging of the RESS 108 in step 710 is less than an expected charging rate during charging of the RESS 108 by at least a predetermined magnitude (i.e., such that $C_+ \ll C^*_+$, with the predetermined magnitude stored in the memory 144 as a stored value thereof 156 in various embodiments). In various embodiments, this determination is made by the processor 142 of FIG. 1 based on the sensor data.

In various embodiments, if it is determined during step 712 that the charging rate $C_+$ during charging is less than an expected charging rate $C^*_+$ during charging of the RESS 108 by at least a predetermined magnitude such that $C_+ \ll C^*_+$), then a fault is reported (step 714). In various embodiments, during step 714, the processor 142 of FIG. 1 determines that a fault is present, and provides one or more notifications of such fault via the display 128 of FIG. 1. In various embodiments, during step 714, one or more audio, visual, haptic, and/or other notifications of a fault of the RESS 108 may be provided via the display 128 of FIG. 1 in accordance with instructions provided by the processor 142. In addition, in certain embodiments, the processor 142 may also provide such fault notifications to a driver or other user of the vehicle 100 via one or more other means, such as by transmitting an electronic message to an electronic device of the user via the transceiver 126 of FIG. 1, among other possible messages and/or other notifications. In various embodiments, the step (or sub-process) 215 then terminates at step 740, and the process 200 returns to FIG. 2 and step 216 thereof (as described further below).

Conversely, in various embodiments, if it is instead determined during step 712 that the charging rate $C_+$ during charging is not less than an expected charging rate during charging of the RESS 108 by at least the predetermined magnitude, then the (i.e., such that $C^*_+ << C^*_+$), then a fault is not reported, the step (or sub-process) 215 then terminates at step 740, and the process 200 returns to FIG. 2 and step 216 thereof (as described further below).

With reference back to step 706, if it is determined during step 706 that the current charging level "e" is greater than or equal to the lower bound "Ur" (i.e., that "e">=" $\overline{e}_l$"), then the process proceeds to step 716 (instead of charging the RESS per the steps described above). Specifically, in various embodiments, during step 716 a determination is made as to the current mode of the vehicle 100. In various embodiments, the current mode of the vehicle 100 pertains to whether the vehicle is (a) in motion; (b) stopped; or (c) providing electrical power to the assembly site 101. In certain embodiments, more specifically, the current mode of the vehicle 100 is selected from one of the following three categories, namely: (a) in motion and not providing electrical power to the assembly site 101; (h) stopped and not providing electrical power to the assembly site 101; and (c) providing electrical power to the assembly site 101 (regardless of whether the vehicle 100 is stopped or in motion). Also in various embodiments, this determination is made by the processor 142 of FIG. 1, for example based on prior instructions of the processor 142 and/or sensor data (e.g., as to the charge and/or discharge of the vehicle 100 via the electrical charge sensors 122 of FIG. 1, and/or via motion of the vehicle 100 as determined via one or more speed sensors or other sensors of the other sensors 124 of the sensor array 120 of FIG. 1, and so on).

In various embodiments, if it is determined in step 716 that the vehicle 100 is in motion (and not providing electrical power to the assembly site 101), then the process proceeds to step 718. In various embodiments, during step 718, a calculation is performed as to the actual discharge rate $C_{M-}$ of the RESS 108 while the vehicle 100 is in motion. In various embodiments, this calculation is performed by the processor 142 of FIG. 1 based on the sensor data from the electrical charge sensors 122 from the sensor array 120 of FIG. 1.

In various embodiments, during step 720 a determination is made as to whether the actual discharge rate $C_{M-}$ of the RESS 108 as calculated in step 718 while the vehicle 100 is in motion is greater than an expected discharge rate $C^*_{M-}$ while the vehicle 100 is in motion by at least a predetermined magnitude (i.e., such that $C_{M-} >> C^*_{M-}$, with the predetermined magnitude stored in the memory 144 as a stored value thereof 156 in various embodiments). In various embodiments, this determination is made by the processor 142 of FIG. 1 based on the sensor data.

In various embodiments, if it is determined during step 720 that the actual discharge rate $C_{M-}$ of the RESS 108 while the vehicle 100 is in motion is greater than an expected discharge rate $C^*_{M-}$ while the vehicle 100 is in motion by at least a predetermined magnitude (i.e., such that $C_{M-} >> C^*_{M-}$), then a fault is reported (step 730). In various embodiments, during step 730, the processor 142 of FIG. 1 determines that a fault is present, and provides one or more notifications of such fault via the display 128 of FIG. 1. Similar to the discussion with respect to step 714, in various embodiments the fault notification may be provided as one or more audio, visual, and/or haptic notices, and/or via one or more electronic messages provided to a driver or other user of the vehicle 100, among other possible notifications. In various embodiments, the step (or sub-process) 215 then terminates at step 740, and the process 200 returns to FIG. 2 and step 216 thereof (as described further below).

Conversely, in various embodiments, if it is instead determined during step 720 that the actual discharge rate $C_{M-}$ of the RESS 108 while the vehicle 100 is in motion is not greater than an expected discharge rate $C^*_{M-}$ while the vehicle 100 is in motion by at least a predetermined magnitude, then a fault is not reported, the step (or sub-process) 215 then terminates at step 740, and the process 200 returns to FIG. 2 and step 216 thereof (as described further below).

With reference back to step 716, if it is instead determined in step 716 that the vehicle 100 is stopped (and not providing electrical power to the assembly site 101), then the process proceeds to step 722. In various embodiments, during step 722, a calculation is performed as to the actual discharge rate $C_{S-}$ of the RESS 108 while the vehicle 100 is stopped. In various embodiments, this calculation is performed by the processor 142 of FIG. 1 based on the sensor data from the electrical charge sensors 122 from the sensor array 120 of FIG. 1.

In various embodiments, during step 724 a determination is made as to whether the actual discharge rate $C_{S-}$ of the RESS 108 as calculated in step 722 while the vehicle 100 is stopped is greater than an expected discharge rate $C^*_{S-}$ while the vehicle 100 is stopped by at least a predetermined magnitude (i.e., such that $C_{S-} >> C^*_{S-}$, with the predetermined magnitude stored in the memory 144 as a stored value thereof 156 in various embodiments). In various embodiments, this determination is made by the processor 142 of FIG. 1 based on the sensor data.

In various embodiments, if it is determined during step 724 that the actual discharge rate $C_{S-}$ of the RESS 108 while the vehicle 100 is stopped is greater than an expected discharge rate $C^*_{S-}$ while the vehicle 100 is stopped by at least a predetermined magnitude (i.e., such that $C_{S-} >> C^*_{S-}$), then a fault is reported (step 732). In various embodiments, during step 732, the processor 142 of FIG. 1 determines that a fault is present, and provides one or more notifications of such fault via the display 128 of FIG. 1. Similar to the discussion with respect to step 714, in various embodiments the fault notification may be provided as one or more audio, visual, and/or haptic notices, and/or via one or more electronic messages provided to a driver or other user of the vehicle 100, among other possible notifications. In various embodiments, the step (or sub-process) 215 then terminates at step 740, and the process 200 returns to FIG. 2 and step 216 thereof (as described further below).

Conversely, in various embodiments, if it is instead determined during step 724 that the actual discharge rate $C_{S-}$ of the RESS 108 while the vehicle 100 is stopped is not greater than an expected discharge rate $C^*_{S-}$ while the vehicle 100 is stopped by at least a predetermined magnitude, then a fault is not reported, the step (or sub-process) 215 then terminates at step 740, and the process 200 returns to FIG. 2 and step 216 thereof (as described further below).

With reference back to step 716, if it is instead determined in step 716 that the vehicle 100 is providing electrical power for the assembly site 101, then the process proceeds to step 726. In various embodiments, during step 726, a calculation is performed as to the actual discharge rate $C_{P-}$ of the RESS 108 while providing power to the assembly site 101. In various embodiments, this calculation is performed by the processor 142 of FIG. 1 based on the sensor data from the electrical charge sensors 122 from the sensor array 120 of FIG. 1.

In various embodiments, during step 726 a determination is made as to whether the actual discharge rate $C_{P-}$ of the RESS 108 as calculated in step 724 while providing power to the assembly site 101 is greater than an expected discharge rate $C^*_{P-}$ while the vehicle 100 is stopped by at least a predetermined magnitude (i.e., such that $C_{P-} \gg C^*_{P-}$, with the predetermined magnitude stored in the memory 144 as a stored value thereof 156 in various embodiments). In various embodiments, this determination is made by the processor 142 of FIG. 1 based on the sensor data.

In various embodiments, if it is determined during step 726 that the actual discharge rate $C_{P-}$ of the RESS 108 while providing power to the assembly site 101 is greater than an expected discharge rate $C^*_{P-}$ while providing power to the assembly site 101 by at least a predetermined magnitude (i.e., such that $C_{P-} \gg C^*_{P-}$), then a fault is reported (step 734). In various embodiments, during step 734, the processor 142 of FIG. 1 determines that a fault is present, and provides one or more notifications of such fault via the display 128 of FIG. 1. Similar to the discussion with respect to step 714, in various embodiments the fault notification may be provided as one or more audio, visual, and/or haptic notices, and/or via one or more electronic messages provided to a driver or other user of the vehicle 100, among other possible notifications. In various embodiments, the step (or sub-process) 215 then terminates at step 740, and the process 200 returns to FIG. 2 and step 216 thereof (as described directly below).

Conversely, in various embodiments, if it is instead determined during step that the actual discharge rate $C_{P-}$ of the RESS 108 while providing power to the assembly site 101 is not greater than an expected discharge rate $C^*_{P-}$ while providing power to the assembly site 101 by at least a predetermined magnitude, then a fault is not reported, the step (or sub-process) 215 then terminates at step 740, and the process 200 returns to FIG. 2 and step 216 thereof (as described further below).

With reference back to FIG. 2, in various embodiments, once the combined step 215 is completed, the process proceeds to step 216. in various embodiments, during step 216, a determination is made as to whether the assembly of the vehicle 100 is completed. In various embodiments, this determination is made by the processor 142 of FIG. 1, for example as to whether any additional components need to be assembled and/or installed as part of the vehicle 100, and/or as to whether any additional assembly and/or other manufacturing processes are required in order to have a fully completed vehicle 100.

In various embodiments, if it is determined that the assembly of the vehicle 100 is not complete, then the vehicle 100 is moved to a new cell 160 for further assembly and/or other manufacture, as the process returns to step 206 as part of new iteration (in accordance with instructions provided by the processor 142 of FIG. 1).

Conversely, in various embodiments, if it is determined that the assembly of the vehicle 100 is complete, then the process 200 terminates at step 218.

Accordingly, methods, systems, and vehicles are provided for providing electrical power from a vehicle to an assembly site during manufacturing the vehicle in various embodiments. Specifically, in various embodiments, as the vehicle moves from cell to cell in an assembly site during assembly and/or other manufacturing processes for the vehicle, a vehicle processor directions electrical power from a rechargeable energy storage system (RESS) from the vehicle to an electrical component of the assembly site cells via one or more different types of electronic power transfer techniques as described above and depicted in the Figures, among various other aspects of the disclose as described above and/or depicted in the Figures.

It will be appreciated that the systems, vehicles, assembly site, components thereof, and methods may vary from those depicted in the Figures and described herein. For example, the vehicle 100 of FIG. 1, the assembly site 101 of FIG. 1, and/or the components thereof may differ from that depicted in FIG. 1. It will similarly be appreciated that the steps of the process 200 may differ from those depicted in FIGS. 2 and 7, and/or that various steps of the process 200 may occur concurrently and/or in a different order than that depicted in FIGS. 2 and 7. It will similarly be appreciated that the various implementation of FIGS. 3-6, 8 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for providing electrical power for a manufacturing facility for manufacturing of a vehicle, the vehicle having a rechargeable energy storage system (RESS) and a processor, the method comprising:
   positioning the vehicle at the manufacturing facility, the manufacturing facility having an electrical component; and
   providing electrical power from the RESS of the vehicle to the electrical component of the manufacturing facility, in accordance with instructions provided by the processor.

2. The method of claim 1, wherein:
   the manufacturing facility comprises an assembly site comprising one or more stations or cells for assembling the vehicle, each of the one or more stations or cells having the electrical component; and
   the step of positioning the vehicle comprises moving the vehicle to a station or cell of the one or more stations or cells, in accordance with instructions provided by the processor.

3. The method of claim 1, wherein:
   the step of providing electrical power comprises providing the electrical power from the RESS of the vehicle to the electrical component of the manufacturing facility via one or more electrical connections therebetween in accordance with instructions provided by the processor.

4. The method of claim 3, wherein:
   the step of providing electrical power comprises providing the electrical power from the RESS of the vehicle to the electrical component of the manufacturing facility via conductive charging that is facilitated by the one or more electrical connections, in accordance with instructions provided by the processor.

5. The method of claim 3, wherein:
the step of providing electrical power comprises providing the electrical power from the RESS of the vehicle to the electrical component of the manufacturing facility via inductive charging that is facilitated by the one or more electrical connections.

6. The method of claim 1, wherein:
the vehicle further includes an electrical port configured to accept a conduit associated with the electrical component of the manufacturing facility; and
the step of providing electrical power comprises providing the electrical power from the RES S of the vehicle to the electrical component of the manufacturing facility via the electrical port when the conduit is plugged into the electrical port.

7. The method of claim 1, wherein:
the manufacturing facility further includes a manufacturing facility RESS that is coupled to the electrical component; and
the step of providing electrical power comprises providing the electrical power from the RESS of the vehicle to the manufacturing facility RESS for use by the electrical component.

8. The method of claim 1, further comprising:
obtaining sensor data with respect to a charging rate or discharging rate of the RESS of the vehicle via one or more sensors of the vehicle; and
providing fault diagnostics for the RESS of the vehicle based on a comparison of the charging rate or discharging rate with one or more threshold values stored in a non-transitory, computer readable storage medium of the vehicle.

9. The method of claim 8, further comprising:
determining, via the processor, a current mode for the vehicle as to whether the RESS of the vehicle is charging, providing electrical power for the manufacturing facility, in motion, or stopped, wherein the one or more threshold values are dependent upon the current mode for the vehicle.

10. A vehicle comprising:
a body;
a rechargeable energy storage system (RESS); and
a processor that is coupled to the RESS of the vehicle and that is configured to at least facilitate:
positioning the vehicle at a manufacturing facility for manufacturing of the vehicle, the manufacturing facility having an electrical component; and
providing electrical power from the RES S of the vehicle to the electrical component of the manufacturing facility, in accordance with instructions provided by the processor.

11. The vehicle of claim 10, wherein:
the vehicle further includes a propulsion system configured to generate movement of the body to the manufacturing facility, the manufacturing facility comprising one or more cells for assembling the vehicle, each of the one or more cells having the electrical component; and
the processor is further configured to at least facilitate moving the vehicle to a cell of the one or more cells, in accordance with instructions provided by the processor.

12. The vehicle of claim 11, further comprising:
wherein the processor is further configured to at least facilitate providing the electrical power from the RESS of the vehicle to the electrical component of the manufacturing facility via one or more electrical connections therebetween, in accordance with instructions provided by the processor.

13. The vehicle of claim 12, wherein the processor is further configured to at least facilitate providing the electrical power from the RESS of the vehicle to the electrical component of the manufacturing facility via charging that is facilitated by the one or more electrical connections, in accordance with instructions provided by the processor.

14. The vehicle of claim 12, wherein:
the processor is further configured to at least facilitate providing the electrical power from the RESS of the vehicle to the electrical component of the manufacturing facility via inductive charging that is facilitated by the one or more electrical connections.

15. The vehicle of claim 10, further comprising:
an electrical port configured to accept a conduit associated with the electrical component of the manufacturing facility;
wherein the processor is further configured to at least facilitate providing the electrical power from the RESS of the vehicle to the electrical component of the manufacturing facility via the electrical port when the conduit is plugged into the electrical port.

16. The vehicle of claim 10, wherein the processor is further configured to at least facilitate providing the electrical power from the RESS of the vehicle to a manufacturing facility RESS for use by the electrical component.

17. The vehicle of claim 10, further comprising:
a non-transitory, computer readable storage medium storing one or more threshold values; and
one or more sensors configured to obtain sensor data with respect to a charging rate or discharging rate of the RESS of the vehicle;
wherein the processor is further configured to at least facilitate providing fault diagnostics for the RESS of the vehicle based on a comparison of the charging rate or discharging rate with the one or more threshold values.

18. The vehicle of claim 17, wherein:
the processor is further configured to at least facilitate determining a current mode for the vehicle as to whether the RESS of the vehicle is charging, providing electrical power for the manufacturing facility, in motion, or stopped; and
the one or more threshold values are dependent upon the current mode for the vehicle.

19. A system comprising:
a manufacturing facility having an electrical component; and
a vehicle configured to be coupled to the manufacturing facility, the vehicle comprising:
a body;
a rechargeable energy storage system (RESS); and
a processor that is coupled to the RESS of the vehicle and that is configured to at least facilitate:
positioning the vehicle at the manufacturing facility; and
providing electrical power from the RESS of the vehicle to the electrical component of the manufacturing facility, in accordance with instructions provided by the processor.

20. The system of claim 19, wherein:
the manufacturing facility comprises an assembly site comprising one or more cells for assembling the vehicle, each of the plurality of cells having the electrical component; and the vehicle further includes a propulsion system configured to generate movement of the body to the manufacturing facility, in accordance with the instructions provided by the processor.

\* \* \* \* \*